(12) United States Patent
Folan et al.

(10) Patent No.: US 6,570,992 B1
(45) Date of Patent: May 27, 2003

(54) MICROPHONE HOLDER

(75) Inventors: Eugene Folan, Galway (IE); Pat White, Co. Claire (IE)

(73) Assignee: Molex, Incorporated, Lisle, IL (US)

( * ) Notice: Subject to any disclaimer, the term of this patent is extended or adjusted under 35 U.S.C. 154(b) by 178 days.

(21) Appl. No.: 09/685,997

(22) Filed: Oct. 11, 2000

(51) Int. Cl.[7] .............................................. H04R 25/00
(52) U.S. Cl. ................................. 381/365; 379/433.03
(58) Field of Search ................................ 381/355, 361, 381/365, 368; 379/433.03, 433.01, 433.05

(56) References Cited

U.S. PATENT DOCUMENTS

| | | | |
|---|---|---|---|
| 4,633,044 A | * 12/1986 | Nakajima | 379/433 |
| 4,984,268 A | 1/1991 | Brown et al. | 379/433 |
| 5,042,071 A | 8/1991 | Stinauer et al. | 381/158 |
| 5,201,069 A | 4/1993 | Barabolak | 455/90 |
| 5,410,608 A | 4/1995 | Lucey et al. | 381/169 |
| 5,615,273 A | 3/1997 | Lucey et al. | 381/169 |
| 5,823,820 A | 10/1998 | Patel et al. | 439/500 |
| 5,836,790 A | 11/1998 | Barnett | 439/620 |
| 5,923,750 A | 7/1999 | Enting et al. | 379/428 |
| 6,068,235 A | 5/2000 | Gaffney et al. | 248/694 |

FOREIGN PATENT DOCUMENTS

| | | | |
|---|---|---|---|
| DE | 35 12944 A1 | 10/1986 | ............ H01R/1/02 |

OTHER PUBLICATIONS

PCT International Search Report, May 17, 2002.

* cited by examiner

*Primary Examiner*—Sinh Tran
(74) *Attorney, Agent, or Firm*—Stephen Z. Weiss

(57) ABSTRACT

A mounting arrangement (1) for connecting an electrical device (2), typically a microphone, within a wireless telephone, is disclosed. The mounting arrangement comprises a housing (3) having an electrical device receiving portion (4). An enveloping portion (5) adapted to envelop the electrical device (2) is also provided, the enveloping portion (5) having at least two outwardly projecting retention tabs (6), the tabs adapted to co-operate and engage with corresponding retention portions (7) within the receiving portion (4). On full insertion of the enveloped electrical device within the receiving portion, the retention tabs engage with the retention portions, thereby securing the enveloping portion and enveloped electrical device within the receiving portion. Both the housing and the electrical device are provided with electrical terminals or connectors such that on securing the enveloped electrical device within the receiving portion electrical engagement between the inserted device and housing is effected.

18 Claims, 2 Drawing Sheets

MICROPHONE HOLDER

FIELD OF THE INVENTION

This invention relates generally to microphone holders, and in particular to a microphone holder that is adapted to be co-operable with a microphone housing and securely retain a microphone in an electrical connector.

BACKGROUND TO THE INVENTION

It is necessary when constructing telephone hand pieces to include a microphone in the assembly. The microphone is typically mounted in a region of the telephone handpiece adjacent to where the user will talk. It is important that the microphone is securely retained and that it is not subjected to large amounts of shock, etc. This retention is typically achieved by positioning the microphone within a housing and securing the housing to an electrical connector within the telephone assembly. It is preferable that the housing have an acoustic insulating element therein, so as to provide an optimum transfer of the required speech to the electronic circuitry while obviating the effect of extraneous noise.

U.S. Pat. No. 4,984,268, assigned to AT&T Bell Laboratories, describes a microphone that is located in a gasket, forming an assembly that is inserted into a cavity in the handset, a cylindrical sponge having been positioned at the base of the cavity. U.S. Pat. No. 5,420,071, assigned to Motorola, describes an apparatus designed to isolate a microphone from the speaker audio unit of a telephone handset. The microphone is inserted into an insulator, where the insulator has circumferentially extending ridges encircling the insulator so as to prevent the removal of the insulator from a retaining cup. An extending tab is also provided which prevents the rotation of the insulator in the cup. The insulator/microphone combination is held within the retaining cup by means of an interference fit. A second US patent assigned to Motorola, U.S. Pat. No. 5,201,069 discloses a microphone that is sandwiched between two gaskets. This microphone/gasket sandwich is held together between the upper portion of the housing and its base, again the securing being achieved by means of an interference fit.

U.S. Pat. Nos. 5,410,608 and 5,615,273, both assigned to the UNEX Corporation, disclose the provision of a microphone within a boot and the retention of the microphone within the boot using a separate cover.

U.S. Pat. No. 5,823,820, assigned to the present assignees, discloses the provision of the microphone with a grommet. Again, the microphone is secured within its retainer by means of an interference fit.

One common feature of the aforementioned arrangements is the retention of the microphone by means of an interference fit. This arrangement is not very secure and it is possible that any vibration of the holder or housing, either as an unassembled component of a radio telephone or when actually in use may lead to the dislodgement of the microphone from its holder. There is, therefore, a need for a more secure means for retaining a microphone within its associated holder.

When mounted in radio or mobile telephones, it is preferable to mount the microphones in an I/O connector, so as to reduce the number of connectors used and the space taken up by individual connectors. Typically, the microphone is positioned within a housing in the connector and a cover is placed over the assembly, thereby retaining the microphone in position. The use of the cover has associated problems in that it adds to the overall thickness of the connector, a problem that is most acute when trying to minimize the overall size of the handset and components utilized.

Therefore a need exists for an alternative mounting arrangement for microphones within connectors of a radio telephone handset, an arrangement that effects the secure retention of the microphone within the mobile telephone with a minimal number of components.

SUMMARY OF THE INVENTION

These needs and others are addressed by the present invention which provides a mounting arrangement for connecting an electrical device within a wireless telephone. The mounting arrangement comprises a housing having an electrical device receiving portion and an enveloping portion adapted to envelop the electrical device. The enveloping portion has at least two outwardly projecting retention tabs, the tabs adapted to co-operate and engage with corresponding retention portions within the receiving portion. On insertion of the enveloped electrical device within the receiving portion, the retention tabs engage with the retention portions, thereby securing the enveloping portion and enveloped electrical device within the receiving portion.

The electrical device is preferably a microphone, which is held within an acoustically insulating enveloping portion or mounting boot.

The receiving portion preferably comprises a base and transversely projecting wall portions. The wall portions extend about a perimeter of the base, thereby defining a perimeter of the receiving portion.

Desirably a guide region is provided in the wall portions, such that the wall portions do not extend completely about the base. The guide portion is adapted to engage with a corresponding guide provided on the enveloping portion.

The retention portions are preferably formed in the wall portions of the receiving portion. The retention portions desirably have side walls, which are substantially parallel to the wall portions, and additionally an upper engagement surface, substantially parallel to the base of the receiving portion.

The receiving portion is preferably provided with connector terminals, the connector terminals adapted to be electrically engageable with corresponding terminals on the electrical device. The connector terminals are desirably positioned near to the base of the receiving portion, such that on insertion of the enveloped electrical device within the receiving portion, the connector terminals within the receiving portion and the terminals on the electrical device are in electrical engagement.

The enveloping portion preferably comprises a base region and upwardly extending side walls. An inner surface of the side walls defines an enveloping region adapted to receive and envelop an inserted microphone. At the base region, the inner surface further defines an entry port through which a microphone may be inserted into the enveloping region, and at an upper region of the enveloping portion the inner surface of the side walls further define an exit aperture. The exit aperture is dimensioned to enable an active surface of an inserted microphone to be exposed.

The projecting retention tabs preferably project from an outer surface of the side walls of the enveloping portion. The tabs have a taper region extending outwardly and upwardly from the base region of the enveloping portion, and an engaging portion extending from the outer surface of the side walls to an outermost point of the taper region The engaging portion is adapted, in use, to engage with the engagement surface of the retention portion.

The enveloping portion is preferably formed from a resilient material, preferably rubber.

Desirably the housing is integrally formed on an electrical connector, the electrical connector having mounting means adapted to effect the mounting of the connector within the telephone.

The invention additionally provides a mounting arrangement for connecting a microphone within a mobile telephone, the mounting arrangement comprising a housing having a microphone insertion cavity and a mounting boot adapted to accommodate the microphone. The boot has at least two projecting retention tabs adapted to co-operate and engage with corresponding retention portions within the cavity. On insertion of the boot and accommodated microphone within the insertion cavity, the retention tabs engage with the retention portions, thereby securing the boot and accommodated microphone within the cavity.

The projecting retention tabs preferably project from an outer wall of the boot, and comprise a taper region extending outwardly and upwardly from the base of the boot to a distal region, and an engaging portion, the engaging portion extending from the outer wall of the boot to the distal region. The engaging portion is adapted, in use, to engage with an upper surface of the retention portion.

The cavity preferably comprises a base and side wall with the retention portions being formed in the side walls of the cavity. The retention portions have side walls and an upper surface. The upper surface is adapted, in use, to engage with the engaging portion of the retention tabs.

The inner surface of the cavity side walls extend about the side of the cavity, defining a cavity area substantially equivalent to the outer perimeter of the enveloping portion.

The invention also provides a method for securing a microphone within an electrical connector. The method desirably comprises the steps of fitting the microphone within a mounting boot and then placing the enveloped microphone into a receiving portion of the electrical connector. The enveloped microphone is positioned into the receiving portion until terminals on the base of the microphone come into electrical engagement with connector terminals provided within the receiving portion. Tabs, radially extending from an outer wall of the mounting boot snap-fit into interengagement with retention portions provided on the side walls of the receiving portion, thereby securing the microphone within the electrical connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following drawings, in which like reference numerals identify like elements in the Figures and in which:

DETAILED DESCRIPTION OF THE DRAWINGS

Figure 2:
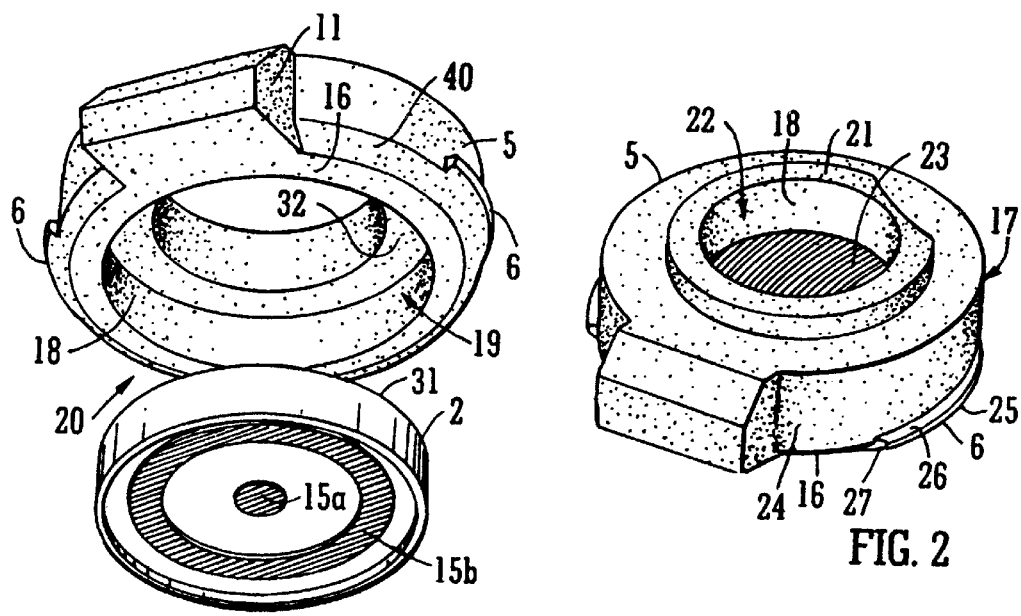
FIG. 2 is a perspective view of a microphone within an enveloping portion.

FIGS. 1 to 4 show a mounting arrangement 1 for connecting an electrical device 2, typically a microphone, within a wireless or radio telephone according to the present invention. The mounting arrangement 1 comprises a housing 3 having an electrical device receiving portion 4 and an enveloping portion 5 or mounting boot adapted to envelop the electrical device 2. As shown, the enveloping portion 5 has two outwardly projecting retention tabs 6, although it will be appreciated that the number of tabs may be increased. The tabs 6 are adapted to co-operate and engage with corresponding retention portions 7 within the receiving portion 4. A bevelled circumferential edge 40 helps to locate the enveloping portion 5 in the receiving portion 4.

Figure 3:
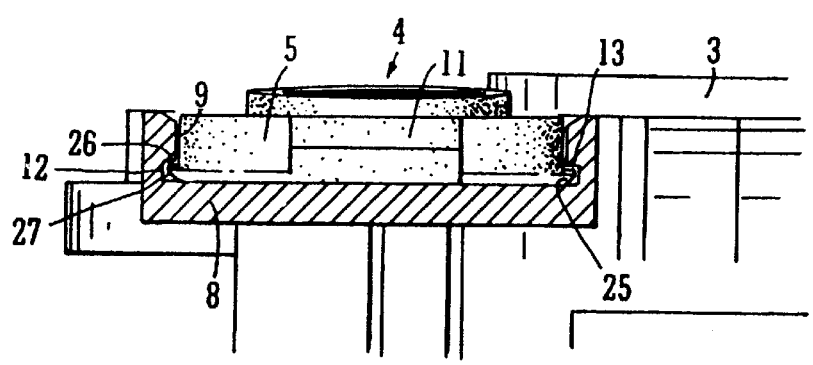
FIG. 3 is a section through a receiving portion with enveloped microphone received therein along the line III—III of FIG. 1.

As shown in FIG. 3, on full insertion of the enveloped electrical device within the receiving portion 4, the retention tabs 6 engage with the retention portions 7, thereby securing the enveloping portion and enveloped electrical device within the receiving portion 4.

The receiving portion 4 preferably comprises a base 8 and transversely projecting wall portions 9, with an angled lead-in portion 41 which co-operates with the bevelled circumferential edge 40 to help align the enveloping portion and the receiving portion. The wall portions 9 extend about the base 8 defining a perimeter of the receiving portion 4.

As shown in the Figures, a guide region 10 may be provided in the wall portions 9, such that the wall portions do not extend completely about the base 8. The guide portion 10 may be adapted to engage with a corresponding radially extending guide 11 provided on the enveloping portion 5 to prevent the enveloping portion 5 from rotating within the receiving portion 4 and also to help locate the enveloping portion so that the retention tabs 6 are aligned with the retention portions 7.

The retention portions 7 are preferably formed in the wall portions 9, the retention portions 7 having side walls 12, substantially parallel to the wall portions 9, and an upper engagement surface 13, substantially parallel to the base 8 of the receiving portion 4.

Figure 1:
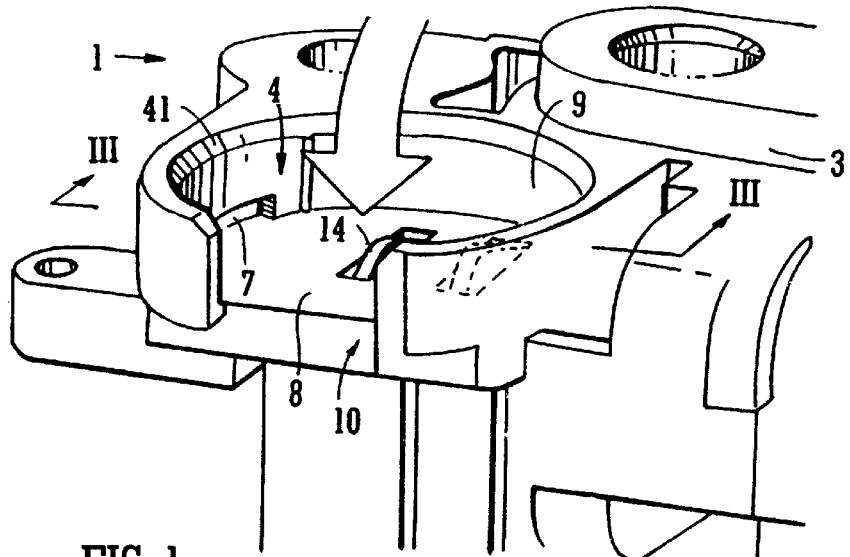
FIG. 1 is an exploded view of a microphone, a microphone enveloping portion and a receiving portion in the housing.

The receiving portion 4 is preferably provided with connector terminals 14. The connector terminals 14 are adapted to be electrically engageable with corresponding terminals 15 on the electrical device 2, which, as shown in FIG. 1, comprise an inner circular terminal 15a and an outer circular terminal 15b, on the electrical device 2. The connector terminals are positioned within the base 8 of the receiving portion 4, and are adapted such that on insertion of the enveloped electrical device 2 within the receiving portion 4, the connector terminals 14 within the receiving portion 4 and the terminals 15 on the electrical device 2 are in electrical engagement. The connector terminals are typically formed from a phosphor bronze gold plated material although it will be appreciated by those skilled in the art that any conductive material may be alternatively used. Similarly, although the microphone terminals are formed typically from a gold plated track on a printed circuit board, any other suitably conductive material may also be used.

Figure 4:
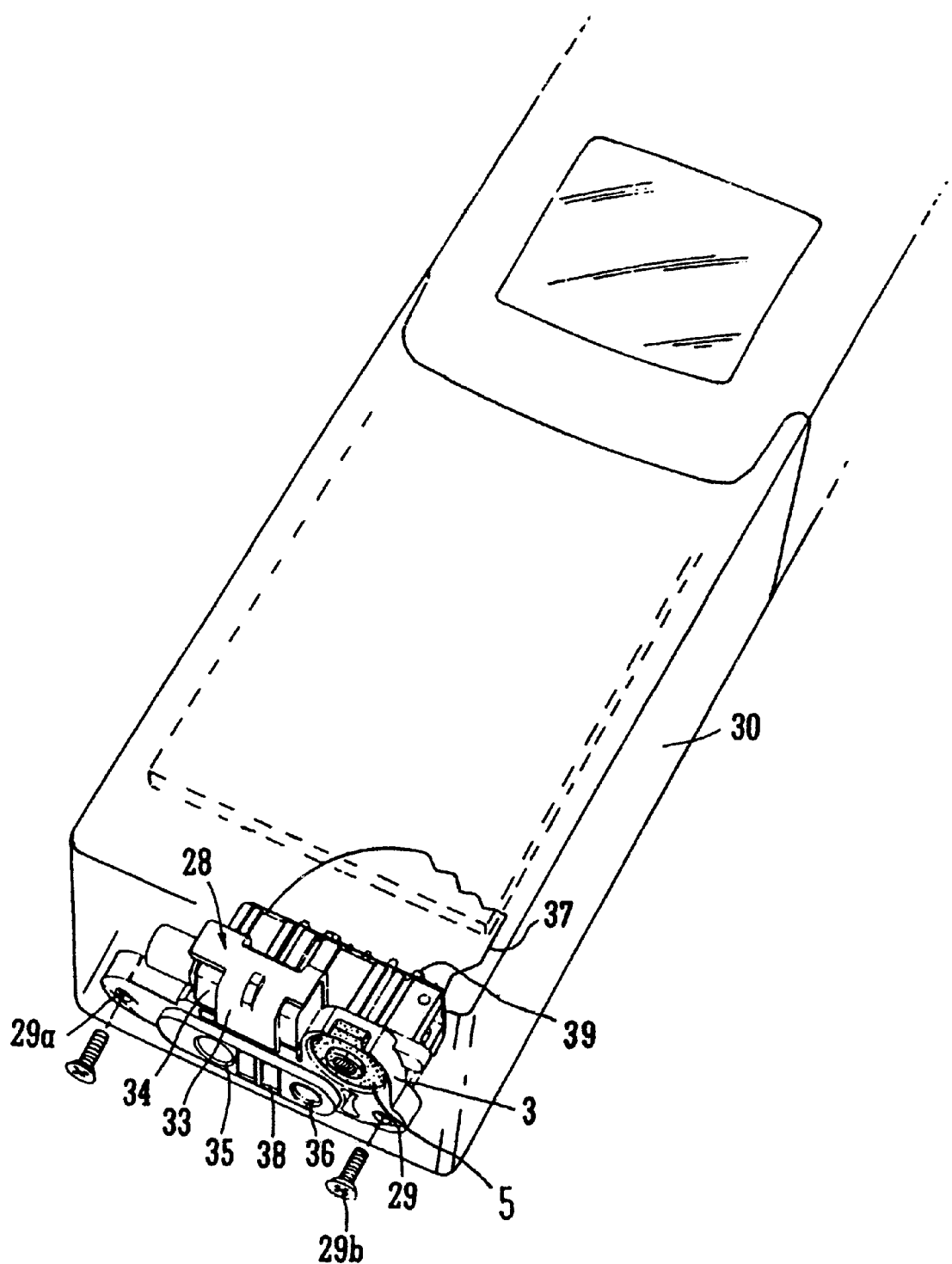
FIG. 4 is a perspective view showing an assembled mounting assembly within a wireless telephone.

The connector terminals 14 within the receiving portion are also in electrical contact with a printed circuit board 37, shown in FIG. 4. The printed circuit board is connectable to other electrical portions of the radio telephone 30, thereby providing electrical contact between the microphone and the remainder of the telephone circuitry.

The enveloping portion 5 preferably comprises a base region 16 with a bevelled circumferential edge 40 and upwardly extending side walls 17. An inner surface 18 of the side walls defines an enveloping region 19 adapted to receive and envelop an inserted microphone 2. At the base region 16 the inner surface 18 further defines an entry port 20 through which a microphone 2 may be inserted into the enveloping region 19. At an upper region 21 of the enveloping portion, the inner surface of the side walls further define an exit aperture 22. The exit aperture 22 is dimensioned to expose an active surface 23 of an inserted microphone 2. On insertion of the electrical device 2 into the enveloping portion 5, an upper face 31 of the electrical device abuts against an inner shoulder 32 of the inner walls 18, thereby preventing the passage of the electrical device 2 through the exit aperture 22 of the enveloping portion 5.

The projecting retention tabs 6 preferably project from an outer surface 24 of the side walls 17 of the enveloping portion 5. The tabs 6 have a taper region 25 extending outwardly and upwardly from the base region 16 of the enveloping portion 5, and an engaging portion 26. The engaging portion 26 extends from the outer surface 24 of the side walls 17 to an outermost point 27 of the taper region 25. The engaging portion 26 is adapted, in use, to engage with the engagement surface 13 of the retention portion 7.

In use, the microphone 2 is inserted into the enveloping portion or mounting boot 5. The enveloped microphone 2 is then inserted into the receiving portion 8, using the guide 11/guide region 10 to effect a correct positioning of the combination relative to receiving portion or insertion cavity 4. Although the extending projecting tabs 6 project beyond the receiving area defined by the side walls 9 of the insertion cavity 4, the provision of a taper region 25 and the formation of the enveloping device 5 from a resilient material enables a temporary deformation of the enveloping portion on presentation to the insertion cavity. As the enveloping portion is inserted further into the cavity, the projecting retention tabs 6 come into communication with the retention portions 7, and can expand into and engage with the retention portions. The engagement of the retention tabs 6 with the retention portions 7 effects a securing of the inserted enveloped microphone within the insertion cavity, obviating the possibility of its accidental removal.

It will be appreciated by those skilled in the art that the enveloping portion is adapted to receive and contain the microphone. Although illustrated in this exemplary embodiment as a structure adapted to substantially surround, or envelop, the inserted microphone, it will be appreciated that it is not an essential feature of the present invention that the entire microphone is contained therein. For example, other non illustrated examples, may provide an enveloping portion adapted to envelop a substantial portion of the microphone, yet not completely surround the side walls of the inserted device. The enveloping portion provides a housing for the inserted device, in combination with the receiving portion, it serves to retain the microphone in electrical contact with the terminals; any alternative design that facilitates the same secure retention will be also applicable to the present invention.

The enveloping portion is preferably formed from a resilient material, typically a rubber or rubber based compound. The enveloping portion forms an acoustical mounting boot about the microphone.

As shown in FIG. 4 the housing 3 is desirably integrally formed on an electrical connector 28, which is typically achieved by plastic moulding. The electrical connector 28 has engagement means 29 adapted to effect the mounting of the connector 28 within a telephone 30. The mounting means 29 are typically threaded apertures 29a which cooperate with a screw 29b or nut so as to secure and retain the connector 28 within the telephone. The electrical connector is typically an I/O type connector which typically has a plurality of additional functional components in addition to the microphone housing. These typically include recharger pads 38 adapted to cooperate with the power supply for recharging the wireless telephone, a holder 33 for a vibration motor 34 and a plurality of electrical terminals or connectors 39 for establishing an electrical connection between connector via the printed circuit board 37 to the remaining portions of the wireless telephone 30. Additional devices such as a DC power port 36 for car recharging situation and/or a stereo jack connector 36 may be provided.

It will be appreciated that the inter-engagement of the retention tabs 6 and corresponding retention portions 7 offers a more secure retention arrangement for an inserted microphone than the interference arrangements of the prior art. As there is provided a definite securing arrangement it is more difficult to remove an inserted device from its housing. This enables the manufacturer to assemble the microphone within an I/O connector in one location and assemble the I/O connector within a telephone in alternative locations without the need for constant inspection to ensure retention of the microphone within the housing—something that was not feasible with the arrangements of the prior art which as a result of vibrations were prone to accidental removal of the microphone from its housings. Furthermore, the more secure fitting arrangement of the present invention achieved by the pressing of a microphone housed within an acoustical boot into its housing offers improved quality of audio transmission through the microphone Words such as "top", "above", "upper", "lower", "upwards", "downwards", "height", "up and down", and the like are used herein with reference to the positions of the device and/or the components thereof illustrated in the drawings and do not necessarily relate to the positions adapted when the device is in use. Such terms are used without limiting effect.

While described in detail here, many modifications and equivalents thereof will be clear to those persons of ordinary skill in the art and are intended to be covered hereby, the full measure of the spirit and scope of the invention being defined by the claims.

We claim:

1. A mounting arrangement for connecting an electrical device within a wireless telephone to a housing, the mounting arrangement comprising:

the housing having a receiving portion with an opening and a base and connector terminals extending within the receiving portion near the base, an enveloping portion having an inner wall adapted to envelop the electrical device, the enveloping portion having a leading edge to be inserted within the opening in the receiving portion and an outer wall with at least two outwardly projecting retention tabs, the tabs adapted to co-operate and engage with corresponding retention portions within the receiving portion, and wherein on full insertion of the enveloped electrical device within the receiving portion, when the terminals of the electrical device are in electrical engagement with the connector terminals, the retention tabs engage the retention portions, thereby securing the enveloping portion and enveloped electrical device within the receiving portion.

2. The mounting arrangement as claimed in claim 1 wherein the electrical device is a microphone.

3. The mounting arrangement as claimed in claim 2 wherein the enveloping portion comprises a base region and upwardly extending side walls, an inner surface of the side walls defining an enveloping region adapted to receive and envelop an inserted microphone, wherein at the base region the inner surface further defines an entry port through which a microphone may be inserted into the enveloping region, and at an upper region of the enveloping portion the inner surface of the side walls further define an exit aperture, the exit aperture being dimensioned to retain at least a portion of the upper surface of the microphone.

4. The mounting arrangement as claimed in claim 3 wherein the projecting retention tabs project from an outer surface of the side walls of the enveloping portion, the tabs having:
   a taper region extending outwardly and upwardly from the base region of the enveloping portion, and
   an engaging portion, the engaging portion extending from the outer surface of the side walls to an outermost point of the taper region, the engaging portion adapted, in use, to engage with an engagement surface of the retention portion.

5. The mounting arrangement as claimed in claim 1 wherein the base of the receiving portion is circular, the receiving portion further comprising transversely projecting wall portions, the wall portions extending about the perimeter of the base, thereby defining a receiving portion.

6. The mounting arrangement as claimed in claim 5 wherein an angled lead in portion is provided at the opening to the receiving portion, the angled lead in portion adapted to co-operate with the leading edge of the enveloping portion to help align the enveloping and receiving portions.

7. The mounting arrangement as claimed in claim 5 wherein the retention portions are formed in the wall portions, the retention portions having side walls, substantially parallel to the wall portions, and an upper engagement surface, substantially parallel to the base of the receiving portion.

8. The mounting arrangement as claimed in claim 1 wherein the enveloping portion is formed from a resilient material.

9. The mounting arrangement as claimed in claim 1 wherein the housing is integrally formed on an electrical connector, the electrical connector having mounting means adapted to effect the mounting of the connector within the telephone.

10. A mounting arrangement for connecting a microphone within a mobile telephone to a housing, the mounting arrangement comprising:
   the housing having a microphone insertion cavity with a base and side walls defining an opening into the insertion cavity and connector terminals extending within the cavity near the base,
   a mounting boot adapted to accommodate the microphone, the boot having at least two projecting retention tabs, the tabs adapted to co-operate and engage with corresponding retention portions within side walls of the cavity, and
   wherein on full insertion of the boot and accommodated microphone within the insertion cavity, when the connector terminals of the cavity are in electrical engagement with terminals on the microphone, the retention tabs engage the retention portions, thereby securing the boot and accommodated microphone within the cavity.

11. A mounting arrangement according to claim 10 wherein the projecting retention tabs project from an outer wall of the boot, the tabs having:
   a taper region extending outwardly and upwardly from the base of the boot, and
   an engaging portion, the engaging portion extending from the outer wall of the boot to an outermost point of the taper region, the engaging portion adapted, in use, to engage with the upper surface of the retention portion.

12. A mounting arrangement according to claim 11 wherein the retention portions have side walls and an upper surface, the upper surface, in use, adapted to engage with the engaging portion of the retention tabs.

13. A mounting arrangement according to claim 10 wherein the side wall of the microphone insertion cavity has a slot perpendicular to the cavity base and the mounting boot has a radially extending locating tab, the locating tab adapted to slide into the perpendicular slot when the retention tabs are in radial alignment with the retention portions in the side wall.

14. An electrical connector connecting a microphone to a printed circuit board a wireless communication device comprising:
   a housing having a cylindrical microphone insertion cavity and connector terminals held to the housing, the connector terminals extending within the microphone insertion cavity adapted to electrically connect a microphone inserted within the cavity to conductors on the printed circuit board,
   an acoustical mounting boot adapted to receive an inserted microphone, the boot having at least one laterally extending retention tab on a peripheral portion of the boot, and
   wherein at least one circumferential slot is provided in the insertion cavity, the at least one slot adapted to receive and accommodate the at least one laterally extending retention tab, such that on full insertion of the mounting boot with the inserted microphone into the insertion cavity, the slot and extending tab inter-engage obviating the removal of mounting boot from the insertion cavity, and the inserted microphone is in electrical contact with the terminals, thereby establishing electrical contact between the microphone and the printed circuit board.

15. The electrical connector as claimed in claim 14 wherein the boot has at least two laterally extending retention tabs and the insertion cavity has a corresponding number of slots.

16. The electrical connector as claimed in claim 15 wherein the tabs are provided on side walls of the boot, the slots also being provided in side walls of the insertion cavity.

17. A method for securing a microphone within an electrical connector comprising the steps of:
   fitting the microphone within an acoustical mounting boot having at least two projecting tabs,
   placing the acoustical mounting boot and retained microphone into a receiving portion of the electrical connector, the receiving portion having a base and side walls, connector terminals extending within the receiving portion near to the base,
   inserting the mounting boot fully into the receiving portion whereby the terminals on the base of the microphone come into electrical engagement with the connector terminals of the receiving portion and the at least two projecting retention tabs snap fit into interengagement with corresponding retention portions provided within the side walls of the receiving portion, thereby securing the microphone within the electrical connector; and retaining the electrical connector within a mobile telephone.

18. The method for securing a microphone within an electrical connector further comprising the additional step of retaining the electrical connector within a mobile telephone.

* * * * *